US010491073B2

(12) United States Patent
Hitchcock et al.

(10) Patent No.: US 10,491,073 B2
(45) Date of Patent: Nov. 26, 2019

(54) POWER ELECTRONICS HOUSING AND PACKAGING FOR FLYWHEEL ENERGY STORAGE SYSTEMS

(71) Applicant: Amber Kinetics, Inc., Union City, CA (US)

(72) Inventors: Roger Nelson Hitchcock, San Leandro, CA (US); Peter Vasilnak, Union City, CA (US); Matthew K. Senesky, Berkeley, CA (US); Mark J. Holloway, Mountain View, CA (US); Daniel Bakholdin, Newbury Park, CA (US); Seth R. Sanders, Berkeley, CA (US)

(73) Assignee: Amber Kinetics, Inc.

( * ) Notice: Subject to any disclaimer, the term of this patent is extended or adjusted under 35 U.S.C. 154(b) by 189 days.

(21) Appl. No.: 15/662,176

(22) Filed: Jul. 27, 2017

(65) Prior Publication Data

US 2018/0034344 A1   Feb. 1, 2018

Related U.S. Application Data

(60) Provisional application No. 62/368,863, filed on Jul. 29, 2016.

(51) Int. Cl.
*H02K 7/02* (2006.01)
*H02K 5/20* (2006.01)
(Continued)

(52) U.S. Cl.
CPC .............. *H02K 5/20* (2013.01); *H02K 5/22* (2013.01); *H02K 5/24* (2013.01); *H02K 7/025* (2013.01); *Y02E 60/16* (2013.01)

(58) Field of Classification Search
CPC ............ H02K 7/02; H02K 7/025; H02K 7/14; H02K 1/14; H02K 1/146; H02K 5/10;
(Continued)

(56) References Cited

U.S. PATENT DOCUMENTS 5,170,336 A * 12/1992 Getter .................. H02M 7/003
361/697
5,760,506 A *  6/1998 Ahlstrom ............ F16C 32/0438
310/74

(Continued)

FOREIGN PATENT DOCUMENTS

CN          1467901 A      1/2004
JP          4937687      *  5/2012    .......... F16C 32/0438

OTHER PUBLICATIONS

Darrelmann et al. "Dynastore—A Flywheel Energy Storage System for Power Quality Applications in the 10 kWh Class", Proc. EESAT '03, Electric Energy Storage, Applications and Technology, Oct. 27-29, 2003, San Francisco, Cal, USA (Year: 2003).*

(Continued)

*Primary Examiner* — Burton S Mullins
(74) *Attorney, Agent, or Firm* — Soquel Group LLC

(57) ABSTRACT

A flywheel energy storage system includes a flywheel housing that encloses a flywheel rotor, a motor/alternator, and a power electronics unit. The power electronics unit includes a power electronics housing directly mounted on the flywheel housing, and one or more power electronic circuits enclosed by the power electronics housing. The direct mounting of the power electronics housing on the flywheel housing enables thermal distribution for passive cooling purposes. The design of the flywheel energy storage system also reduces the vibrational forces imparted by the power electronics housing on the flywheel housing.

8 Claims, 6 Drawing Sheets

(51) Int. Cl.
    *H02K 5/24* (2006.01)
    *H02K 5/22* (2006.01)

(58) Field of Classification Search
    CPC .......... H02K 5/128; H02K 7/08; H02K 7/086; H02K 11/0094; F04D 13/0606; F04D 13/0626; F04D 13/064; F04D 29/628; F04D 29/22; F15C 2361/55
    USPC .................. 310/64, 74, 194, 89; 361/678
    See application file for complete search history.

(56) References Cited

U.S. PATENT DOCUMENTS

| | | | |
|---|---|---|---|
| 5,767,595 A | 6/1998 | Rosen et al. | |
| 5,931,249 A * | 8/1999 | Ellis | B60K 1/02 180/165 |
| 6,624,542 B1 | 9/2003 | Gabrys et al. | |
| 6,675,872 B2 | 1/2004 | Lewis et al. | |
| 6,703,735 B1 * | 3/2004 | Gabrys | F16C 32/0465 310/181 |
| 6,707,187 B1 * | 3/2004 | Gabrys | H02K 7/025 310/74 |
| 6,784,562 B2 * | 8/2004 | Gennesseaux | F24D 11/005 290/2 |
| 7,053,589 B2 * | 5/2006 | Gabrys | H02K 7/025 310/74 |
| 7,066,050 B1 * | 6/2006 | Gabrys | B60L 50/30 74/572.1 |
| 9,515,531 B2 * | 12/2016 | Jansen | H02K 7/09 |
| 9,892,839 B2 * | 2/2018 | Sanders | H01F 7/206 |
| 2002/0187059 A1 | 12/2002 | Gold et al. | |
| 2007/0145745 A1 | 6/2007 | Woods et al. | |
| 2010/0283340 A1 | 11/2010 | Fradella | |
| 2011/0298293 A1 | 12/2011 | Veltri | |
| 2013/0112187 A1 | 5/2013 | Cedar et al. | |
| 2014/0124172 A1 * | 5/2014 | Veltri | F16F 15/302 165/104.19 |
| 2015/0334857 A1 * | 11/2015 | Yamamoto | H05K 5/0213 174/520 |
| 2016/0065032 A1 * | 3/2016 | Sanders | H02K 7/025 74/572.11 |
| 2018/0006539 A1 * | 1/2018 | Sanders | H02K 19/18 |

OTHER PUBLICATIONS

S.Richey, "CleanSource2 Battery-Free Energy Storage, Theory of Operation" EESAT 2002 Conference (Year: 2002).*
PCT International Search Report for Written Opinion for PCT/US2017/044246, Oct. 10, 2017, 10 Pages.

* cited by examiner

POWER ELECTRONICS HOUSING AND PACKAGING FOR FLYWHEEL ENERGY STORAGE SYSTEMS

BACKGROUND

1. Field of Art

This description generally relates to energy storage, and particularly to energy storage using flywheels.

2. Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and spinning and non-spinning reserves on thermal generators allow for generation that matches high and variable load. However, despite the availability of such techniques, there are often instances where energy storage is important for meeting energy load.

Currently existing energy storage systems all have drawbacks of one form or another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven, increasing the rotational speed of the flywheel rotor. When power is to be extracted, the flywheel rotor drives the motor/alternator. The faster a flywheel rotor can spin, the more energy it can store, the more stress is induced on the rotor. Generally, a flywheel's bearing and suspension subsystem is designed to minimize energy losses due to friction, and other loss sources.

Most flywheel energy storage systems used for applications related to power grids such as uninterrupted power supply (UPS), frequency regulation, or grid storage, are typically operated for relatively short durations of 1-15 minutes. Such systems generally supply relatively large amounts of power for a relatively short duration of time. For example, a typical power output of 100 kilowatts (kW) to 400 kW for 15 minutes is common for a flywheel in such applications. The heat generated by the power electronic components, due to dissipation is usually 2% to 5%, hence 2 kW to 20 kW. Due to the resulting heat, these flywheel energy storage systems currently rely on separate, actively powered, cooling subsystems, often physically separated from the flywheel unit(s) by at least some distance. Such actively powered cooling subsystems would dissipate power in the range of 2 to 20 kW. As an example, U.S. Pat. No. 6,675,872 describes a device, system and method for dissipating heat energy generated by a flywheel unit that relies on a heat pipe to convey the heat generated by the flywheel to a physically remote heat dissipation device.

It would be advantageous to be able to use a flywheel energy storage system to store and supply energy to and from an electrical grid over a longer period of time. For example, a hypothetical flywheel unit able to supply 8 kW of power over a period of 4 hours with normal operating electrical losses of 2% to 5% would dissipate an amount of power in the range of 160 W to 400 W. Compared with the example of 2 kW to 20 kW above, this is significantly less heat to be dissipated, and as such, using an actively powered system might consume more power than the amount of heat to be dissipated in the first place. Therefore, for purposes of cost and power efficiency (e.g., amount of power consumed relative to the amount of power stored), it is highly impractical to use active cooling methods and mechanisms in a flywheel energy storage system designed to store power over long periods.

SUMMARY

Embodiments relate to a flywheel energy storage system with a flywheel housing enclosing a flywheel rotor, a motor/alternator and a power electronics unit. The power electronics unit includes a power electronics housing directly mounted on the flywheel housing, and one or more power electronic circuits enclosed by the power electronics housing. In some configurations, the design of the flywheel rotor is based on keeping a principally lateral mode resonance frequency below an operating frequency of the flywheel rotor, and keeping a conical mode resonance frequency different from the operating frequency of the flywheel rotor.

Embodiments further relate to a flywheel energy storage system with a heat source generating a heat flow and a heat sink receiving the heat flow. The heat source includes the bearing and suspension system, the motor/alternator, and the power electronics unit. The heat sink includes a flywheel housing made of a top plate, a bottom plate, and one or more cooling surface between the top plate and the bottom plate, and a power electronics housing directly mounted on the flywheel housing. The heat sink transfers the received heat flow to an external environment based on thermal process, including, but not restricted to forced convection, unforced convection, and radiation from exposed surfaces.

Embodiments further relate to a heat transferring system for a flywheel energy storage device including a heat source and a heat sink. The heat source includes the bearing and suspension system, the motor/alternator, and the power electronics unit generating a first heat flow and the power electronics housing directly mounted on the flywheel housing. The power electronics housing includes one or more power electronics circuits generating a second heat flow. The heat sink includes a first set of air vents transferring a coolant (e.g. air) toward the power electronics housing and a second set of air vents transferring at least one of the coolant, the first heat flow, and the second heat flow to an external medium surrounding the power electronics housing.

Figure 1:
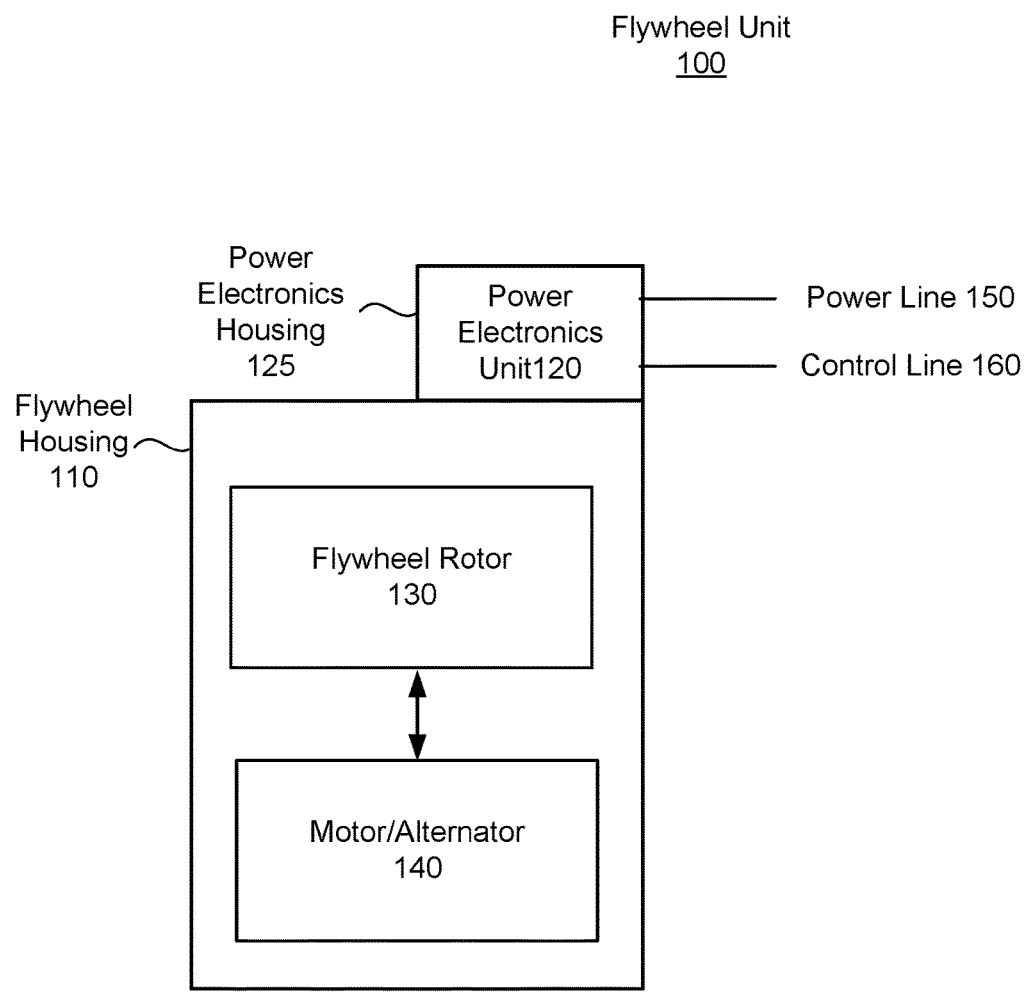
FIG. 1 is a block diagram of a flywheel unit, according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present description relates to the packaging and housing of power electronics components performing operations such as power conversion, sensing, communications and status monitoring to drive an electric machine. For certain flywheel applications, it is advantageous to mount such power electronic components as closely as possible with a flywheel housing. Such an arrangement reduces high-frequency motor-drive cable lengths and avoids the accompanying electromagnetic challenges of co-located sensing and drive cabling.

The system can also be configured to make use of passive cooling for the power electronics components of a flywheel by mounting the power electronics components onto the housing of a flywheel unit. Mounting of the power electronics components directly on the flywheel housing permits sharing of a large thermal dissipation surface area of the flywheel housing. However, mounting the power electronics components to the flywheel housing of existing flywheel energy storage systems may be problematic due to vibration that, over a longer time, may lead to loose or faulty electrical connections and contacts. Flywheels may generate vibration at various rotor RPMs due to residual rotor imbalance that excite resonances associated with the suspension and/or isolation subsystems in such flywheel systems. Thus, a flywheel system design that obviates resonance-related vibration at normal operating speeds is desirable.

Furthermore, the power electronics components that perform power conversion in a flywheel energy storage system may dissipate 0.5-10% of the handled power which equates to heat that must be dissipated. For a representative 8 kilowatt (kW) flywheel system, the power dissipation corresponds to 160-400 W. So long as the design of the housing accounts for resonance-related vibrations as described above, mounting such a power conversion system on a large steel housing with multiple square meters of exposed surface area permits passive cooling via passive convection, without any need for forced air, liquid cooling, etc. Further, the thermal impedances are such that negligible temperature rises are developed in the interface between the flywheel housing and the ambient air.

This approach offers several further advantages, including, but not restricted to:

(1) Co-location of the power electronics unit with the flywheel unit that allows for simple sharing of the heat dissipation capacity across the flywheel unit. This avoids additional costs and complexity for additional heat sinks, forced air, or liquid cooling subsystems.

(2) Co-location of the power electronics unit on the flywheel housing reduces the lengths of sensitive cabling used for sensing and/or communications, avoiding challenges with electromagnetic interference.

(3) Co-location of the power electronics unit with components such as a motor drive inverter (not shown here), reduces lengths of motor drive cabling, improves cable efficiency, and avoids challenges with stray capacitance and communication of any interference signals.

I. Flywheel Energy Storage System

Figure (FIG. 1 is a block diagram of a flywheel unit 100 according to one embodiment. The flywheel unit 100 includes a flywheel housing 110, a power electronics unit 120, flywheel rotor 130, a motor/alternator 140, and optionally a bearing system (not shown here). The power electronics unit 120 includes electrical components including, but not restricted to, power converters, sensors, communication circuits, etc. The flywheel rotor 130 is a rotating component of the flywheel unit 100. The flywheel unit 100 includes one or more heat sources generating heat flow and one or more heat sinks receiving the generated heat for dissipation purposes, as described in detail below with reference to FIGS. 4 and 5. The flywheel rotor 130 is associated with an operating frequency, a lateral mode resonance frequency, and a conical mode resonance frequency, as described in detail with reference to FIG. 6.

The motor/alternator 140 converts between electrical and mechanical energy, so that energy can be stored in or drawn from the flywheel rotor 130. The motor/alternator 140 is physically coupled to the flywheel rotor 130 either directly or indirectly using a shaft. The motor/alternator 140 is coupled to the remainder of the flywheel unit 100 via wires or other electrical couplings. Generally, although only one of each component is shown, in practice, a flywheel energy storage system may include multiples of each individual component.

In some embodiments, the power electronics unit 120 includes a power electronics housing 125 that encloses and houses electrical components such as a power converter for converting the input alternating current into an alternating current acceptable to the motor/alternator 140. The power electronics housing 125 may be susceptible to vibrational forces on the flywheel housing 110, as described in detail below with reference to FIG. 4. The design of the flywheel rotor 130 minimizes the vibrational forces imparted by the power electronics housing 125, as described in detail below with reference to FIG. 6.

In alternate embodiments, power electronics unit 120 converts the alternating current from the motor/alternator 140 into a direct current output. Power electronics unit 120 may also include sensors, processors, memory, computer storage, and network adapters as necessary to perform communications, control and status monitoring of the flywheel unit 100. Sensors may include multi-axis accelerometers, gyros, proximity sensors, temperature sensors, strain sensing elements and the like. Power electronics unit 120 receives and provides power via a power line 150 which may be AC or DC. In certain embodiments, power electronics unit 120 has a control line 160 for receiving and transmitting control signals. Control line 160 may be a physical cable such as an ethernet cable; alternatively it may communicate over a wireless communication link such as WIFI or BLUETOOTH.

The motor/alternator 140 converts between electrical and mechanical energy, so that energy can be stored in or drawn from the flywheel rotor 130. The motor/alternator 140 combines the function of a motor and an alternator. The motor/alternator 140 couples to the flywheel rotor 130 either directly, for example, by mounting the electromagnetic rotor directly on the flywheel rotor 130, or indirectly, for example using a coupling in any form (e.g. shaft(s), bearings, gears, belts, pulleys, etc.) The motor/alternator 140 is electrically coupled to the power electronics unit 120 via wires or other electrical couplings that typically run along the interior of the flywheel housing 110.

In the embodiment of FIG. 1, the flywheel housing 110 is shown as housing for enclosing a single flywheel rotor 130 and a single motor/alternator 140. In alternate embodiments, a single flywheel housing 110 may enclose multiple flywheel rotors and motor/alternators. Further, although a single power electronics unit 120 is depicted, the power electronics unit 120 may be housed in two or more mounted power electronics units without departing from the scope of the subject matter of the invention.

II. Flywheel Unit

Figure 2:
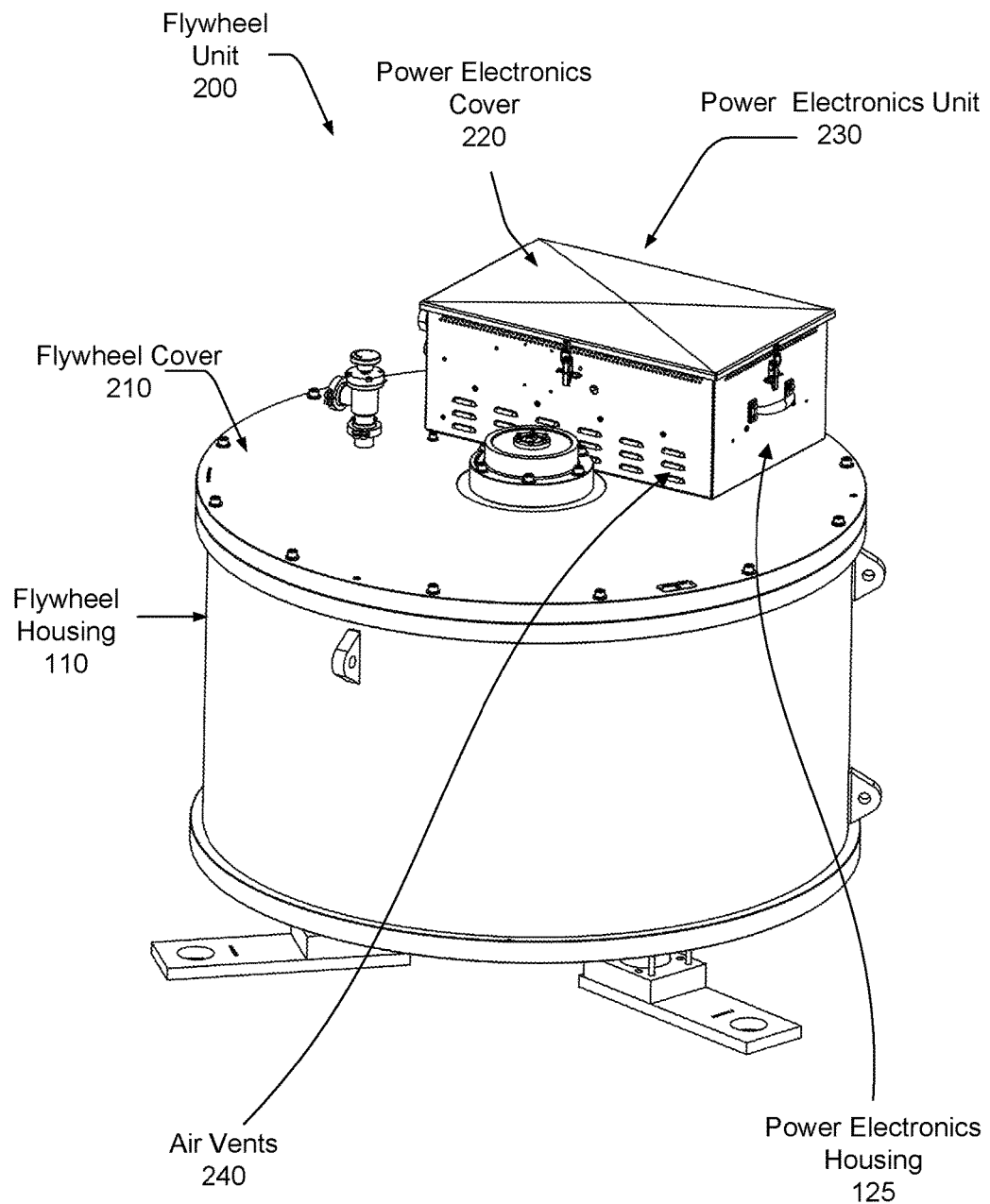
FIG. 2 is an illustration of a flywheel unit including a power electronics unit mounted on top of a flywheel cover, according to one embodiment.

FIG. 2 illustrates a flywheel unit 200 that includes a power electronics unit 230 mounted on top of a flywheel cover 210, according to one embodiment. The flywheel unit 200 includes the flywheel cover 210, a power electronics cover 220, a power electronics unit 230 and a plurality of air vents 240.

The flywheel cover 210 is a portion of the flywheel housing 110 that surrounds a top portion of the flywheel housing 110. In alternate embodiments, the flywheel cover 210 may be dome shaped.

The power electronics unit 230 is an embodiment of the power electronics unit 120 of FIG. 1. The power electronics unit 230 is typically mounted on the top as an attachment to the flywheel cover 210. In alternate configurations, the power electronics unit 230 can be mounted on the side or bottom of the flywheel unit 200. In another configuration, the power electronics cover 220 can be separated from the power electronics housing 125 for servicing purposes.

The power electronics unit 230 includes the air vents 240 that provide an air flow between the interior of the power electronics unit 230 and the external surrounding. The air vents 240 provide a passive air flow from the relatively warmer interior of the power electronics unit 230 to the exterior of the power electronics unit 230, as described in detail below with reference to FIG. 3. The power electronics cover 220 is a portion of the power electronics unit 230 that covers a top portion of the power electronics housing 125.

Furthermore, the direct mounting of the power electronics unit 230 on the flywheel housing 110 is based on design criteria such as keeping (a) a predominantly lateral mode resonance frequency in the range of 10-40 Hz below an operating working speed of 3000-10000 rpm of the flywheel rotor 130, and (b) a conical mode resonant frequency different from the operating frequency of the flywheel rotor 130, as described below with reference to FIG. 6.

Figure 3:
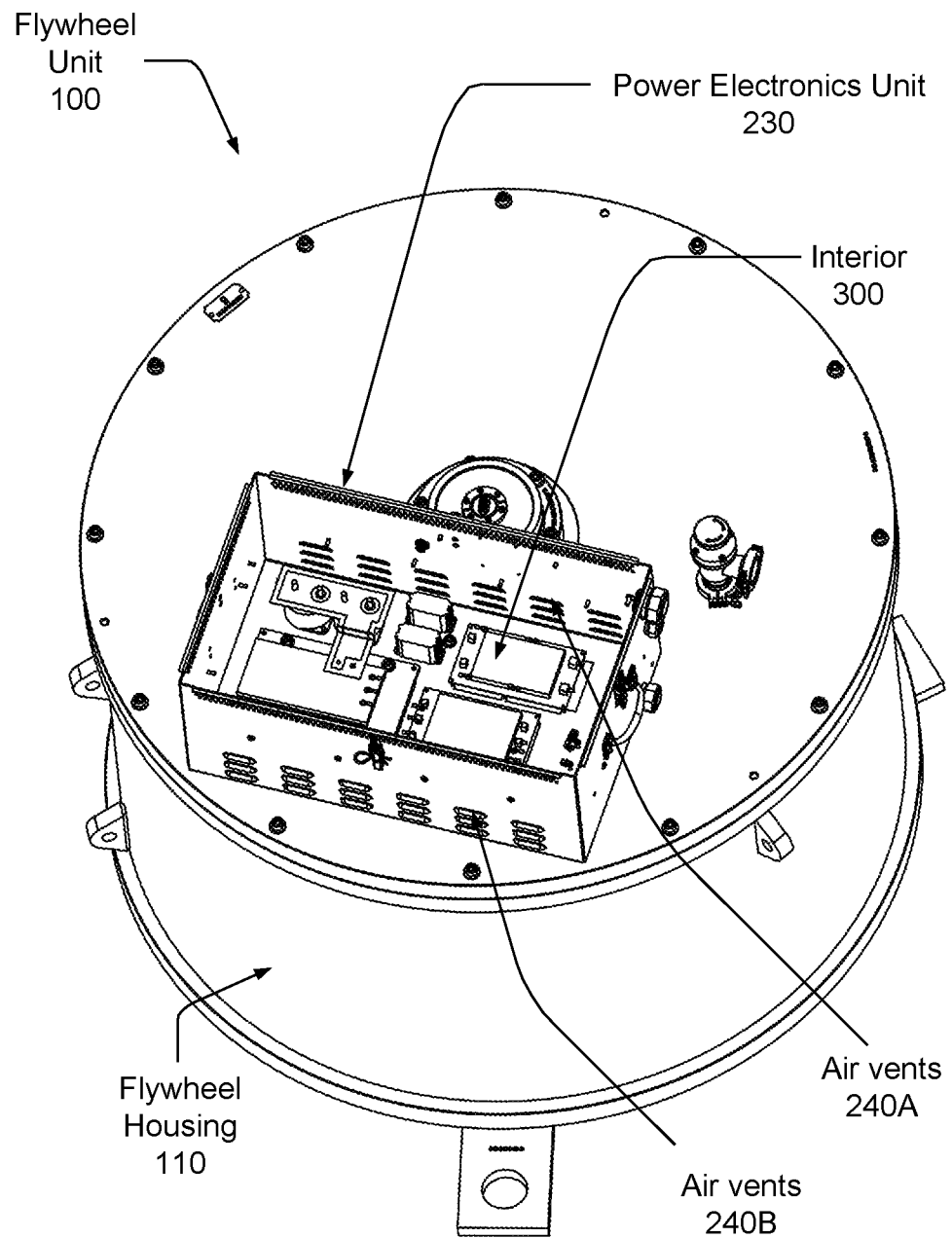
FIG. 3 is an illustration of an interior of the power electronics unit of FIG. 1, according to one embodiment.

FIG. 3 is an illustration of an interior 300 of the power electronics unit 230 of FIG. 2, according to one embodiment. The power electronics unit 230 is directly mounted on the flywheel housing 110 of the flywheel unit 100. The interior 300 of the power electronics unit 230 includes power electronic circuits with components such as sensors, processors, memory, computer storage, and network adapters that are necessary to perform communications, control and status monitoring of the flywheel unit 100. In some configurations, each component in the interior 300 of the power electronic unit 230 physically and thermally coupled to the flywheel housing 110, either directly or indirectly via mounting to the bottom surface of the power electronics housing 125 which itself is physically and thermally coupled to the flywheel housing 110.

In some embodiments, as described below in detail with reference to FIG. 5, the interior 300 includes a plurality of power electronic circuits forming a vertical stack. For example, the power electronics unit 230 includes a first set of power electronic circuits at the bottom and a second set of power electronic circuits at a vertical distance of separation from the first set of power electronics circuits. The power electronics unit 230 may also include one or more air vents 240A for each of the set of power electronics circuits for passive air cooling purposes. The different layers of electronics of the stack each thermally coupled to the flywheel housing 110, for example via internal surface structures of the power electronics housing 125.

In the example of FIG. 3, the air vents 240A and 240B are located on two opposite sides of the power electronics unit 230. Each of the air vents 240A and 240B is a a set of openings formed on the walls of the power electronics unit 230 for passive air cooling purposes. The air vents 240A include a rectangular array of openings with three rows and six columns along with a threshold value of distance of separation between each of the openings. The example of FIG. 3 shows a design of air vents 240A for illustrative purposes only, and in other embodiments other air vent designs and orientations on the power electronics unit 230 may be used.

III. Heat Transfer System

Figure 4:
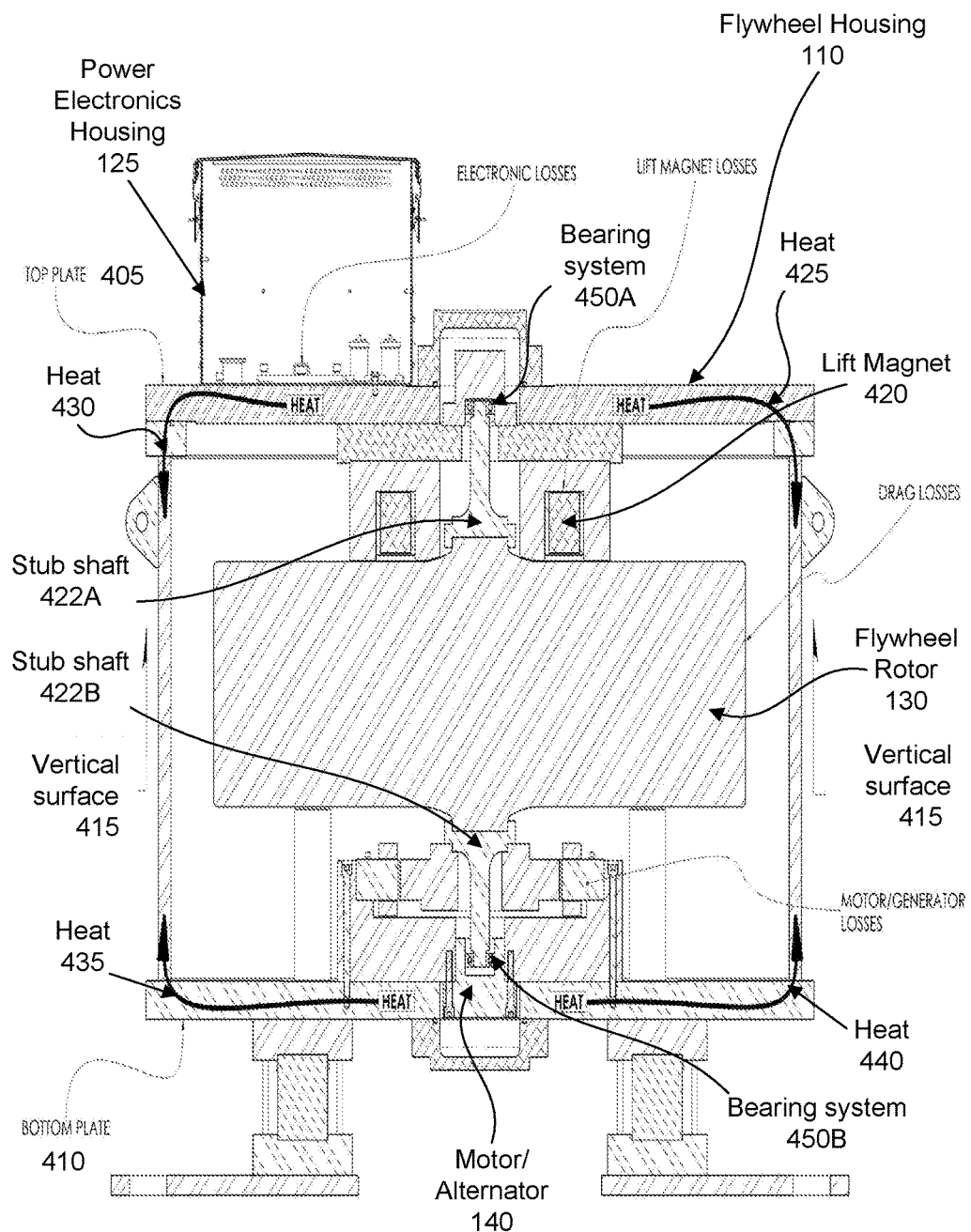
FIG. 4 is a cross sectional view of the flywheel unit of FIG. 2 showing the thermal conduction across various components, according to one embodiment.

FIG. 4 is a cross sectional view 400 of the flywheel unit 200 of FIG. 2 showing the various sources of heat within the flywheel unit 200 as well as example locations of significant thermal conductance across various components, according to one embodiment. The cross sectional view 400 includes the flywheel housing 110 and the power electronics housing 125 directly mounted on the flywheel housing 110. The cross sectional view 400 indicates one or more heat sources and one or more heat sinks receiving the generated heat flow for dissipation purposes. The one or more heat sinks are thermally coupled to the one or more heat sources for re-distributing heat away from the heat sources towards the larger surface areas of the power electronics housing 125 and flywheel housing 110 to allow for better passive cooling.

The flywheel housing 110 includes a top plate 405, a bottom plate 410, one or more vertical surfaces 415, and one or more intermediate surfaces (not shown here). The flywheel housing 110 encloses the flywheel rotor 130, the motor/alternator 140, one or more lift magnets 420 and one or more stubshafts 422A and 422B.

The top plate 405 is a thermally conductive plate that surrounds a top portion of the flywheel housing 110. The top plate 405 is generally made of a metal material (e.g. steel), though any type of rigid, thermally conductive material may be used. The top plate 405 performs transfer of the heat received from a thermally coupled body to an external surrounding. For example, the top plate 405 transfers the heat 425 and 430 received from the power electronics housing 125, the flywheel rotor 130, and the one or more lift magnets 420, to an external environment (e.g. air) based on a passive convection and/or thermal radiation process at the exposed surfaces of the top plate 405.

The bottom plate 410 is a thermally conductive plate that surrounds a bottom portion of the flywheel housing 110. The bottom plate 410 is generally made of a metal material (e.g. steel), though any type of rigid, thermally conductive material may be used The bottom plate 410 transfers heat received from a thermally coupled body to an external surrounding. For example, the bottom plate 410 transfers the heat 435 and 440 received from the motor/alternator 140 to the external surroundings (e.g. air) based on a thermal radiation process at the exposed surfaces of the bottom plate 410.

The vertical surface 415 is a thermally conductive body that is a portion of the flywheel housing 110. In the embodiment of FIG. 4, the vertical surface 415 is coupled to the top plate 405 and the bottom plate 410 for thermal distribution purposes. The vertical surface 415 is generally made of a metallic material (e.g. steel), though any type of rigid, thermally conductive material may be used. The vertical surface 415 transfers the heat received from the interior of flywheel housing 110 to an external surrounding. Specifically, the vertical surface 415 transfers the heat 425 and 430 received from the flywheel rotor 130, and the one or more lift magnets 420, and the heat 435 and 440 received from the motor/alternator 140 to an external environment (e.g. air) based on natural passive convection at the exposed surfaces of the vertical surface 415.

The power electronics housing 125 is thermally coupled to the flywheel housing 110 such that a portion of the heat generated by the power electronics assembly 125 gets transferred to the flywheel housing 110. As described below in detail with reference to FIG. 5, both the power electronics housing 125 and the flywheel housing 110 dissipate heat generated by the flywheel unit 100 based on passive convection cooling. However, generally there may be more heat generated within the housing 125 than can be dissipated via the housing 125 alone, and so some heat transfers to the housing 110 where it is cooled by the larger surface area of the housing 110.

In the embodiment of FIG. 4, the cross sectional view 400 includes heat sources resulting from the electrical or mechanical loss. Heat sources include heat generated by the motion of the flywheel rotor 130 relative to the bearing systems 450A and 450B and other associated components (e.g., drag, lift, and frictional losses), heat generated from the operation of the motor/alternator 140, and heat generated by the operation of the power electronic unit 230.

The cross sectional view 400 also includes heat sinks formed by the power electronics housing 125, the top plate 405, the bottom plate 410, and the vertical surface 415. Each heat sink receives a portion of the heat generated by the heat sources and dissipates the heat based on a thermal radiation and/or a passive convection process.

Figure 5:
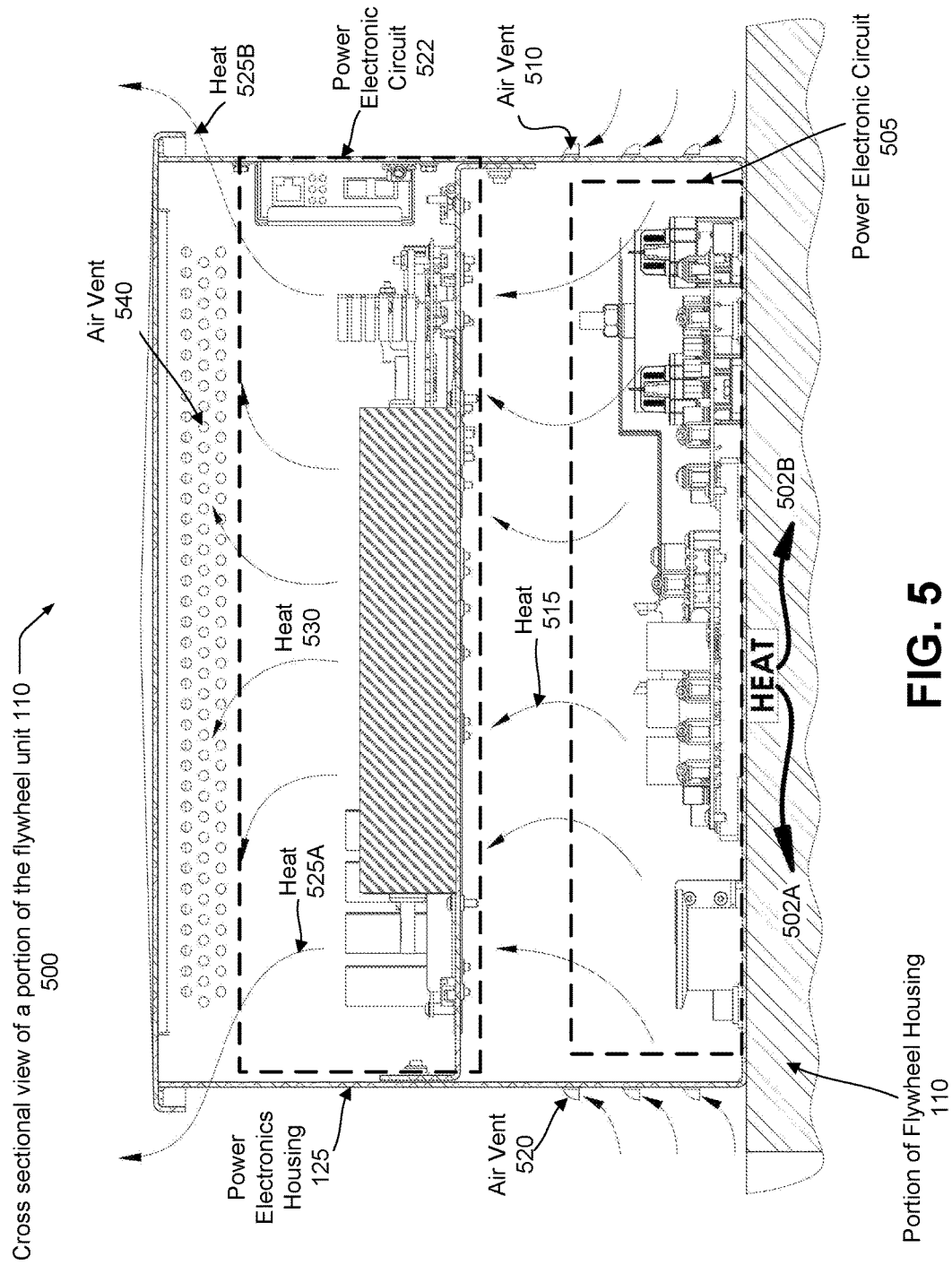
FIG. 5 is a cross sectional view of the power electronics unit of FIG. 2 showing the thermal conduction across various components, according to one embodiment.

FIG. 5 is a cross sectional view 500 of the power electronics unit 230 of FIG. 2 showing the convective air flow across various components, according to one embodiment. The cross sectional view 500 includes a portion of the flywheel housing 110 and the power electronics housing 125. The power electronics housing 125 is directly mounted on the portion of the flywheel housing 110 for thermal distribution purposes.

In the embodiment of FIG. 5, the power electronics housing 125 includes a power electronics circuit 505, a power electronics circuit 522, a first set of air vents 510 and 520, and a second set of air vents 540. Each of the power electronics circuit 505 and the power electronics circuit 522 is a set of power electronics components that perform at least one of: communication, sensing, electrical drive, storage, and networking. In alternate configurations, the power electronics circuit 505 and the power electronics circuit 522 may be located side by side along a horizontal plane.

Each of the air vents 510, 520 and 540 is an opening formed on the walls of the power electronics housing 125 for passive air cooling purposes. In some configurations, the air vents 540 is a rectangular array of openings, positioned substantially at the top of the power electronics housing 125. The example of FIG. 5 shows a design of air vents 540 for illustrative purposes only. It will be obvious for one of ordinary skill in the art that alternative designs of air vents 520 and 540 may be employed for passive cooling purposes.

In some configurations, the air vents 510 and 520 receive a coolant (e.g. air) from an external surroundings that passes over the power electronics housing 125. The power electronic circuit 505 generates heat 515. This heat will either be dissipated by circulating air or will be thermally conducted along the power electronic housing 125 toward the air vent 540. Similarly, the power electronic circuit 520 generates heat 525A, heat 525B, and heat 530. This heat is also either dissipated by the circulating air or is thermally conducted along the power electronic housing 125 toward the air vent 540.

IV. Resonance Modes in Flywheel Unit

The direct mounting of the power electronics housing 125 on the flywheel housing 110 makes the power electronics assembly susceptible to vibrational motion of the flywheel housing 110. For example, when the flywheel rotor 130 is rotating (e.g., at a mechanical frequency of 50 Hz), small residual unbalance of the rotor results in extremely low amplitude synchronous 50 Hz vibration of the housing. The vibration amplitude is only significant at the mechanical system resonant frequencies. In general, vibrationally induced forces act on each of the separate components of the flywheel unit 100, including notably the power electronics housing 125 mounted on the flywheel housing. Large amplitude vibrationally induced forces may be immediately destructive to the electronics assembly, or if persistently present, may constitute a reliability hazard. Significantly, the present invention relies on a mechanical system design that limits peak housing accelerations at any resonant frequency to levels well below destructive levels. And, further, the present invention relies on a mechanical system design that places mechanical resonances outside the normal operating speed range of the flywheel system. Thus, large amplitude vibrations are avoided during the normal lifetime operation of the flywheel system.

Figure 6:
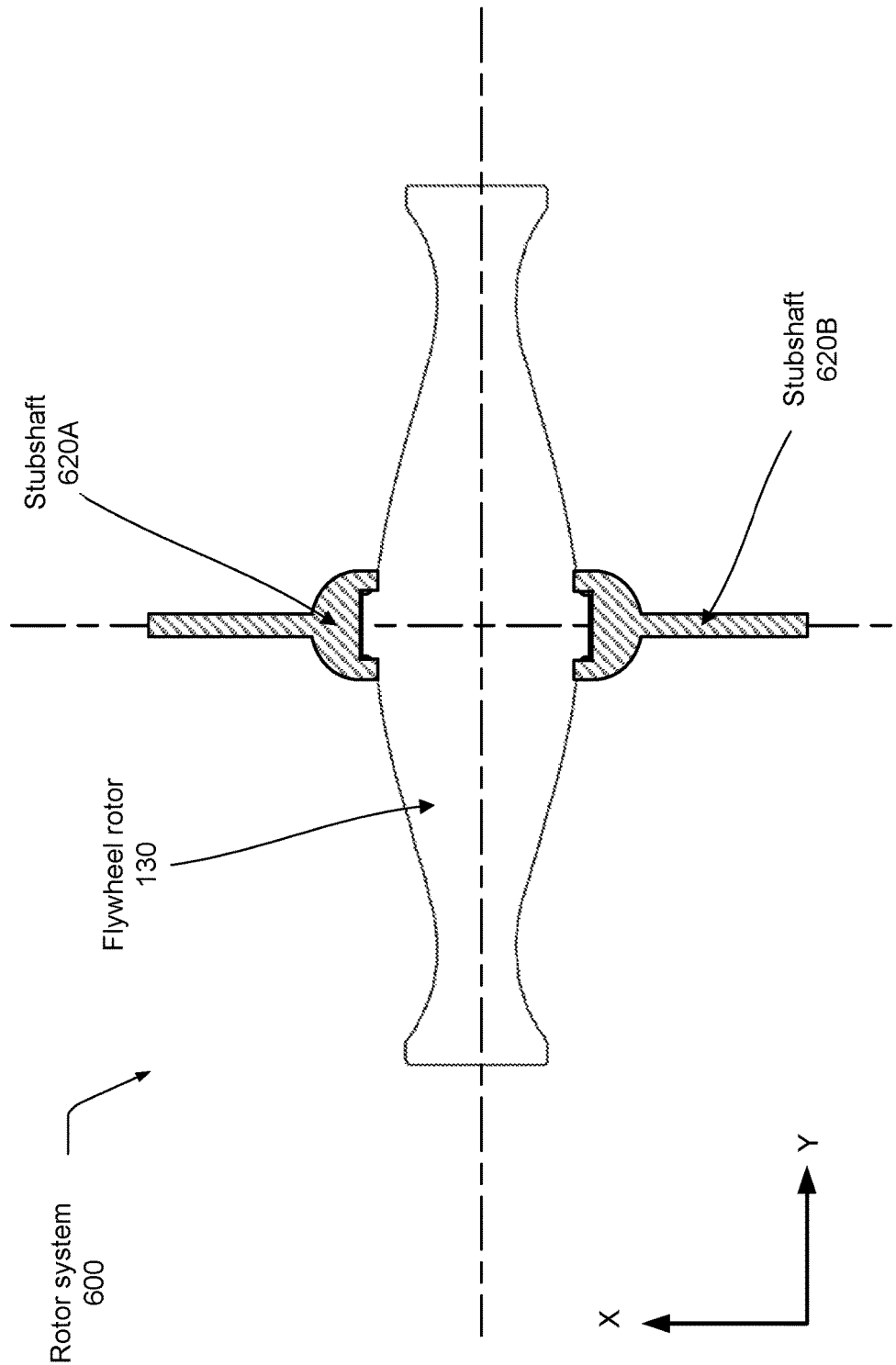
FIG. 6 is an illustration of a rotor suspension system with stubshafts, according to one embodiment.

FIG. 6 is an illustration of a rotor system 600 with stubshafts, according to one embodiment. The rotor suspension system 600 includes the flywheel rotor 130 and one or more stubshafts 620A and 620B The rotor system 600 uses the compliance of a pair of symmetric stubshafts 620A and 620B coupled to the flywheel rotor 130 to set the resonances of the flywheel unit 100.

The resonances correspond to rigid body modes of the flywheel rotor 130, often known as lateral and conical resonance modes. The lateral resonance mode corresponds to the predominant circular displacement of the rotational motion of the flywheel rotor 130 within a plane of rotation (e.g. X-Y plane). Typical motion patterns at the lateral resonance mode are synchronous combinations of translations comprising the two lateral degrees of freedom, thus typically circular or elliptical in nature, since the lateral resonance mode has two degrees of freedom along the X-axis and the Y-axis. The frequency of the lateral resonance mode is determined by the mass of the flywheel rotor 130 and a composite bending compliance of the stubshafts 620A and 620B. The lateral resonance mode is nominally independent of the rotational frequency and other gyroscopic effects of the flywheel rotor 130.

On the other hand, the conical resonance mode is a mode in which a polar axis of inertia of the flywheel rotor 130 oscillates about the axis defined by the bearing system. The conical resonance mode also has two degrees of freedom along each of the diametric axis. The natural frequency of the conical resonance mode is strongly sensitive to the rotation speed and the shape of the flywheel rotor 130. A hypothetical flywheel rotor 130 with a wide and flat disk (not shown here) results in the conical mode natural frequency increasing faster than the rotational frequency of the flywheel rotor 130. The net effect is the total avoidance of a conical mode resonance synchronous with the rotational frequency of the flywheel rotor 130.

To avoid conical and lateral resonance modes, in one embodiment, the rotor system 600 is configured to have relatively wide and flat flywheel rotor to keep the conical mode frequency out of the working speed range. The stub-shafts 620A and 620B can be designed to meet any bending compliance requirements, and thus appropriate selection of bending compliance keeps the lateral resonance mode below the working speed range and also avoids the conical resonance mode during normal operation of the flywheel rotor 130. Configuring the rotor system 600 according to these constraints reduces the amount of vibrational forces on the power electronics unit 120 from the rotor system 600, thereby allowing the power electronics unit 120 to be directly mounted on the flywheel housing 110 in a secure manner without risk of failure due to vibrations.

Without loss of generality, it should be noted that other variations of the disclosed dynamical design arrangement are also encompassed herein. For example, the flywheel housing 110 may include a compliant footing system (not shown here), to facilitate installation, seismic isolation, etc. Inclusion of an isolating footing makes the flywheel system a multi-body dynamical system. The same design principle may still be followed, so that any additional natural frequencies introduced are set below a desired speed range. Finally, it is worth noting that any practical dynamical system has infinite natural frequencies, with nearly all of these corresponding to spurious high frequency modes.

For purposes of this description, the terms "coupled" and "connected" are not synonymous. Herein, "coupled" means that two components are linked either directly or indirectly through one or more intermediate layers. "Connected," by contrast, means that two components are linked directly together with no intermediate layers separating them. Components can be coupled or connected in a variety of manners, e.g., physically, thermally, electrically, or otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flywheel energy storage system comprising:
  a heat dissipating assembly comprising:
    a flywheel rotor;
    a bearing system;
    a motor and an alternator; and
    a power electronics unit;
    the heat dissipating assembly generating a heat flow; and
  a heat sink comprising:
    a flywheel housing physically enclosing the flywheel rotor, the motor, and the alternator, comprising:
      a top plate; wherein a top portion of the bearing system protrudes above the top plate; and
      a bottom plate; and
    a power electronics housing, in the form of an enclosed box positioned to the side of the portion of the bearing system that protrudes above the top plate, comprising a cover, sides, and a bottom wherein the bottom mounts to the outside of the flywheel housing, which is thermally coupled and physically coupled to the outside of the flywheel housing, the power electronics housing physically enclosing the power electronics unit,
  wherein the heat dissipating assembly transfers the generated heat flow to the heat sink.

2. The flywheel energy storage system of claim 1, wherein the heat sink transfers the generated heat flow to an external environment based on a passive convection from one or more surfaces exposed to the external environment.

3. The flywheel energy storage system of claim 1, wherein the heat sink transfers the generated heat flow to an external environment based on a thermal radiation from one or more surfaces exposed to the external environment.

4. The flywheel energy storage system of claim 1, wherein the flywheel housing further comprises one or more vertical surfaces located between the top plate and the bottom plate and configured to cool the flywheel energy storage system.

5. The flywheel energy storage system of claim 1, wherein the power electronics housing bottom is physically connected directly to the top plate of the flywheel housing and transfers heat to the top plate.

6. The flywheel energy storage system of claim 1, wherein the heat sink further comprises:
  a set of air vents in the power electronics housing.

7. The flywheel energy storage system of claim 6, wherein the set of air vents comprises a first set of air vents located at a first side of the power electronics housing and a second set of air vents located at a second side opposite to the first side.

8. The flywheel energy storage system of claim 6, wherein the set of air vents comprises a third set of air vents substantially at the top of the power electronics housing.

* * * * *